United States Patent [19]

Christie

[11] Patent Number: 4,475,384
[45] Date of Patent: Oct. 9, 1984

[54] TIRE SIDEWALL DEFORMATION DETECTION TECHNIQUES

[75] Inventor: William C. Christie, Tallmadge, Ohio

[73] Assignee: The Goodyear Tire & Rubber Company, Akron, Ohio

[21] Appl. No.: 512,591

[22] Filed: Jul. 11, 1983

Related U.S. Application Data

[63] Continuation-in-part of Ser. No. 339,990, Jan. 18, 1982, Pat. No. 4,440,018.

[51] Int. Cl.³ .......................... B60C 19/10; G01B 5/28
[52] U.S. Cl. ...................................... 73/146; 33/174 P
[58] Field of Search ................ 73/146; 33/174 P, 203, 33/203.11, 203.12

[56] References Cited

U.S. PATENT DOCUMENTS

| | | | |
|---|---|---|---|
| 3,722,270 | 3/1973 | Sperberg | 73/146 |
| 4,402,218 | 9/1983 | Engel | 73/146 |
| 4,434,652 | 3/1984 | Christie | 73/146 |

Primary Examiner—Donald O. Woodiel
Attorney, Agent, or Firm—T. P. Lewandowski; R. E. Larson

[57] ABSTRACT

An improvement in a tire manufacturing system including means for testing the extent of sidewall deformation of a tire. The tire is rotated and measured for lateral runout of both sidewalls. The resulting data is converted to digital form and analyzed by groups in order to increase the accuracy by which unacceptable sidewall bulges and valleys are detected.

40 Claims, 14 Drawing Figures

$MAX_1 = 20$, $MIN_1 = 0$, $NEW\ PTP_1 = 20-0 = 20, PTP_1=20$ $MAX_2 = 24$, $MIN_2 = 8$, $NEW\ PTP_2 = 24-8 = 16, PTP_2=20$

TIRE SIDEWALL DEFORMATION DETECTION TECHNIQUES

RELATED APPLICATION

This is a continuation-in-part of U.S. application Ser. No. 339,990 entitled "Tire Sidewall Deformation Detection Techniques," filed Jan. 18, 1982 by the present applicant, now U.S. Pat. No. 4,440,018.

BACKGROUND AND SUMMARY

This invention relates to the manufacture of vehicle tires and more particularly relates to the portion of the manufacturing process by which the quality of the tire sidewalls is maintained.

The tire industry has long sought an automated method of improving the quality of single-ply tires. Such tires weigh less and cost less than multiple ply tires and therefore are particularly attractive for use on lightweight economy vehicles.

While single-ply tires have become attractive for use on economy cars, certain problems inherent with those tires have become apparent. A particular problem evolves from irregularities in the ply splice at the sidewall of the tire. If this splice is other than a flush butt fit, the sidewall at the splice may exhibit undesired characteristics. For example, if the splice is lapped, the sidewall becomes exceptionally strong at that point, being effectively a double-ply at the splice. When inflated, the sidewall at the splice may not expand to the same degree as the sidewall as a whole, thus generating a deformation commonly termed a "valley." While this valley is an indication of exceptional strength at that point of the sidewall, if the valley is excessive, it becomes unsightly and therefore unmarketable. In the case of an open splice, the sidewall is weakened such that, when inflated, the weakened area at the splice will excessively expand to define a deformation commonly termed a "bulge." Such a bulge is not only an indication of a weakened area in the sidewall, but becomes unsightly if excessive.

Bulges and valleys are peculiar to single or mono-ply tires, since tires of multiple plies are typically of sufficient strength to be unaffected by an open or lapped splice in any of the plies. In a single ply tire, an open splice results in reduced ply strength at the affected area of the sidewall, while a lapped splice results in an effective doubling of the strength at that area.

Since the undesirability of a bulge or valley is partially aesthetic, different users of the tires will have different specifications for determining the maximum dimensions of valleys or bulges (or both) which are acceptable. Ideally, the tire quality control portion of the manufacturing process should be conveniently adaptable to different specifications.

There have been several teachings in the art of apparatus for sensing and testing the dimensional characteristics of a tire. Applicant is aware of U.S. Pat. Nos. 3,895,518; 3,303,571; and 2,25,803, all of which teach a technique for monitoring the sidewall of a tire. However, each of these patents is of a rudimentary mechanical nature, capable of sensing only that the sidewall of a mounted tire has exceeded the limit unassociated with the tire itself.

U.S. Application Ser. No. 270,087, "Method and Apparatus For Tire Sidewall Bulge And Valley Detection," filed June 3, 1981 in the name of Jean Engel and assigned to the assignee of the present application, now U.S. Pat. No. 4,402,218 issued Sept. 6, 1983 discloses an improvement in the art of detecting sidewall deformations by measuring the slope of the sidewall bulges or valleys with analog circuitry. However, this technique is somewhat less accurate than desired for certain applications, especially if the quality control specification for the tire requires that a bulge be distinguished from a valley.

Accordingly, it is a primary object of the present invention to improve the manufacture of tires by furnishing an automated digital technique for accurately and rapidly determining the extent of sidewall deformations in a tire.

Another object is to provide a technique of the foregoing type capable of distinguishing sidewall bulges from valleys.

Still another object is to provide a technique of the foregoing type in which test criteria can be rapidly and accurately changed to accommodate different tire specifications.

Yet another object is to provide a technique of the foregoing type in which different limits can be used to detect excessive bulges and valleys.

Another object is to provide a technique of the foregoing type particularly adapted to distinguish a sidewall bulge and a sidewall valley adjacent to each other.

Yet a further object is to provide a technique of the foregoing type in which a single limit can be used to detect excessive bulges and valleys that are adjacent or nonadjacent.

In order to achieve these objectives, the applicant has totally departed from the analog differentiating and slope comparing circuitry of Engel. The applicant has discovered that digital circuitry, including a memory and processor, provides more accurate results. According to one aspect of this invention, the processor divides data from the tire sidewall into a plurality of groups which are individually analyzed. The results and then combined and compared with a predetermined limit which can be readily altered. According to another aspect of the invention, in each group, the highest data value is subtracted from the lowest data value to obtain a peak-to-peak value. The largest peak-to-peak value is stored in order to evaluate the sidewall deformations of the tire. By these techniques, the condition of a tire can be indicated with a degree of accuracy and reliability previously unobtainable.

DESCRIPTION OF THE DRAWINGS

These and other objects, advantages and features of the invention will appear for purposes of explanation, but not limitation, in connection with the accompanying drawings wherein like numbers refer to like parts throughout and wherein.

DESCRIPTION OF THE PREFERRED EMBODIMENTS

Figure 1:
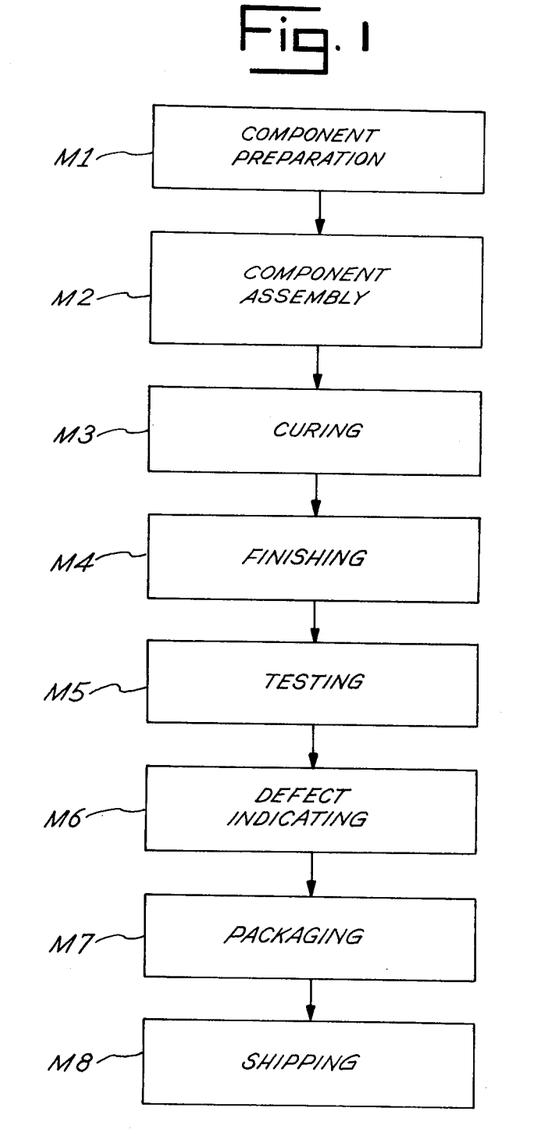
FIG. 1 is a schematic flow diagram of an exemplary method of manufacturing a vehicle tire.

Referring to FIG. 1, eight basic steps of manufacturing a vehicle tire are shown in blocks M1-M8. In step M1, rubber compounds are mixed and some tire fabric is coated with the compounds. In addition, various component parts of the tire, such as tread and belts, are fabricated and cut to proper size. In step M2, the prepared components are assembled together on a mandrel. In step M3, the assembled components are cured, thereby solidifying the component parts into a unified whole. In step M4, raw edges created during the curing process are cut or ground and, in some cases, letters and other indicia are cut into the sidewall of the tire. In step M5, the tire is tested for defects, an important part of the overall manufacturing process which is critical for single ply tires. In step M6, tires with defects, if any, are indicated. Two methods of indication are: (1) marking the defective tire with an appropriate indicia, or (2) segregating defective tires from good tires. In step M7, the tires are packaged in preparation for shipment to a customer (step M8).

Figure 2:
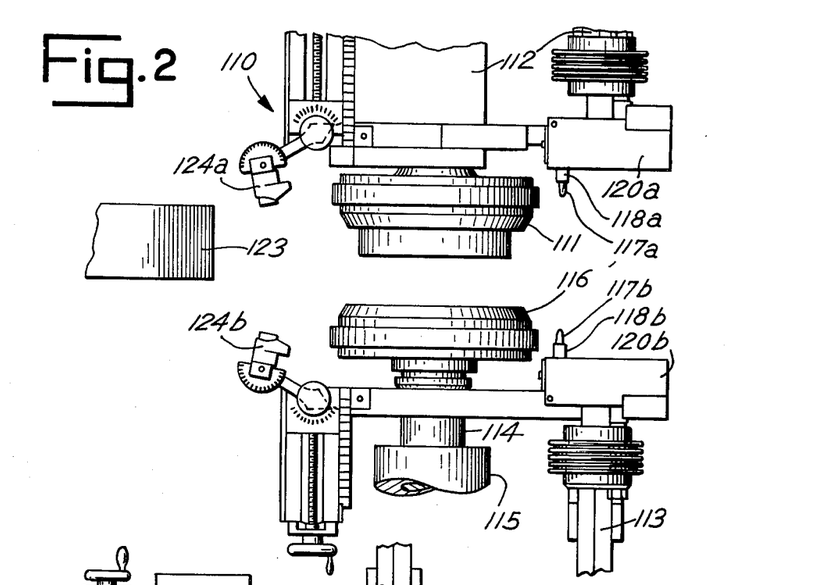
FIG. 2 is a fragmentary, side elevational view of a conventional tire force variation measuring and grinding machine adapted to provide certain input measurement signals required by the preferred embodiments of the invention.
Figure 3:
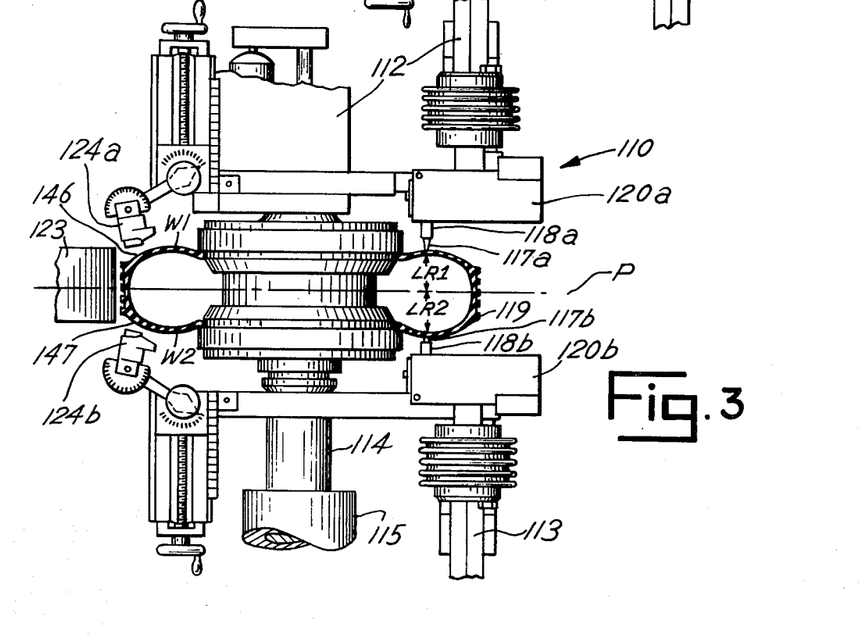
FIG. 3 is another view of the apparatus shown in FIG. 2 in which a tire is mounted and inflated, and tracking probes are positioned to provide the input measurement signals.

Referring to FIGS. 2 and 3, a portion of testing step M5 may be carried out by a tire force variation measuring and grinding machine suitably adapted for tracking probes which measure the lateral runout on each of the two sidewalls of a cured tire. Such machines are well known in the art, and need not be described in detail. One such machine is shown in U.S. Application Ser. No. 188,707, entitled "Tire Dynamic Imbalance Screening System," filed Sept. 19, 1980 in the names of Kounkel et al., and assigned to the same assignee as the present application. As described in more detail in that application, a force variation testing machine 110 has an upper chuck 111 rotatably mounted on an upper frame 112. A lower frame 113 supports a vertical spindle 114 for rotation and vertical movement in a sleeve 115 attached to the frame. A lower chuck 116 is mounted on spindle 114 and is axially movable from an open retracted position shown in FIG. 2 to a close extended position shown in FIG. 3.

Tracking probes 118a and 118b capable of generating an analog signal proportional to the lateral runout of the tire sidewalls preferably include a tip 117a and a tip 117b. The probes are connected to rotational displacement transducers mounted on upper frame 112 and lower frame 113 for engagement with a tire 119 mounted between chucks 111 and 116 as shown in FIG. 3. Probes 118a and 118b are carried by measuring mechanism supports 120a and 120b, respectively, which are vertically adjustable relative to upper frame 112 and lower frame 113 to provide clearance for movement of tire 119 between upper chuck 111 and lower chuck 116. The vertical adjustment may be provided by air-actuated piston and cylinder apparatus mounted on frames 112 and 113 which carry the measuring mechanism supports 120a and 120b from retracted positions shown in FIG. 2 to extended positions, shown in FIG. 3, with tips 117a and 117b in contact with tire 119.

Tire inflating apparatus, such as a port (not shown) in one of chucks 111 or 116 is also provided for communication between the space enclosed by tire 119 and a source of air pressure. A load roller 123 is movable radially of tire 119 into engagement with the tread of the tire and may be used to seal the tire on the bead seats of upper chuck 111 and lower chuck 116.

As an alternative to tips 117a and 117b, proximity sensors 124a and 124b may be carried on the measuring mechanism supports 120a and 120b for vertical adjustments into positions spaced from the tire. Sensors 124a and 124b provide signals indicating lateral runout as tire 119 is rotated on chucks 111 and 116.

Figure 5:
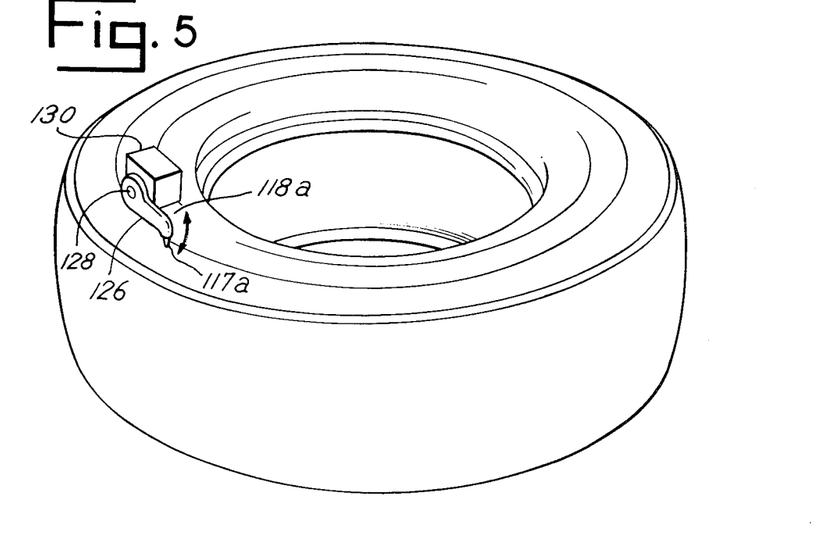
FIG. 5 is a schematic view of the tire shown in FIG. 4 illustrating the placement of a tracking probe on the sidewall of the tire.
Figure 6:
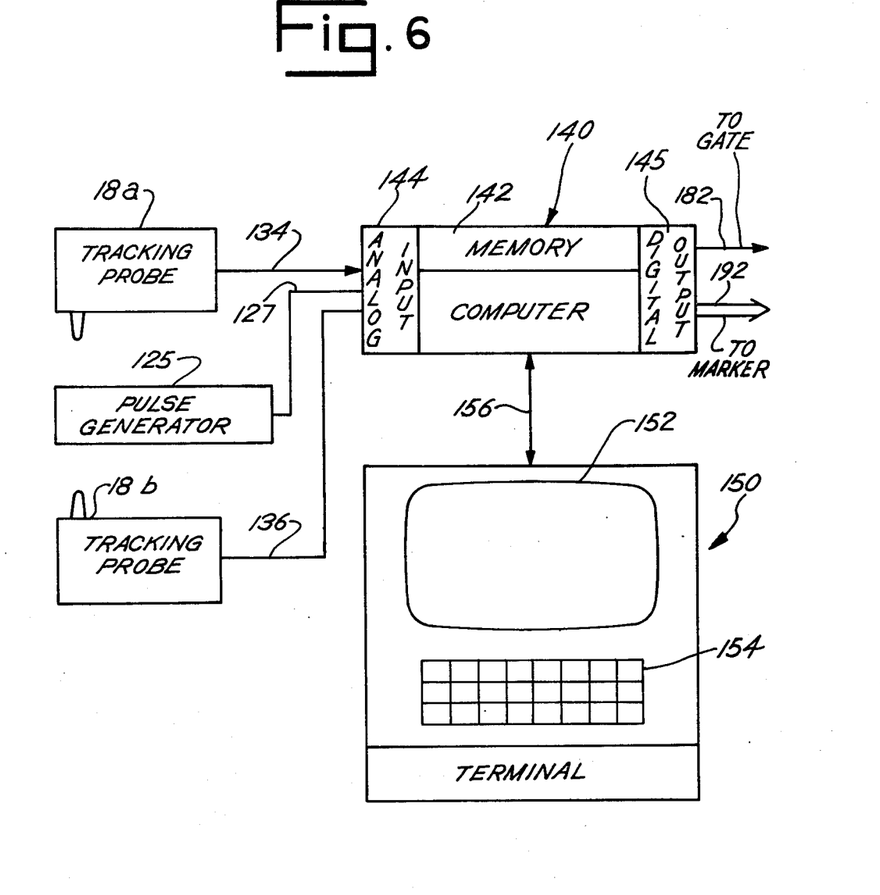
FIG. 6 is an electrical schematic block diagram illustrating a preferred form of processing and memory apparatus for use in connection with the preferred embodiment as connected to the tracking probes.

Referring to FIG. 5, probe 118a is shown in more detail. Probe 118b is identical to probe 118a and may be understood with reference to FIG. 5. Probe 118a comprises an aluminum arm 126 bearing a carbide tip 117a. The arm rotates with an axle or pin 128 and is biased by a spring (not shown) which urges the arm toward the tire sidewall. The arm is made as light as possible and the spring force is the minimum needed to cause the tip to follow the undulations in the sidewall of the tire. Rotation of arm 126 caused by contact with tire 119 causes pin 128 to rotate inside a resolver 130. The resolver acts as a transducer which converts the movement of the probe against the sidewall of the rotating tire into a corresponding analog signal on output conductor 134 (FIG. 6). The signal has a value proportional to the vertical position of the tire sidewall. A similar signal for the opposite sidewall is produced on a conductor 136 connected to the transducer associated with probe 118b (FIG. 6). Additional details of resolver 130 are described in the above-identified Engel application.

Figure 4:
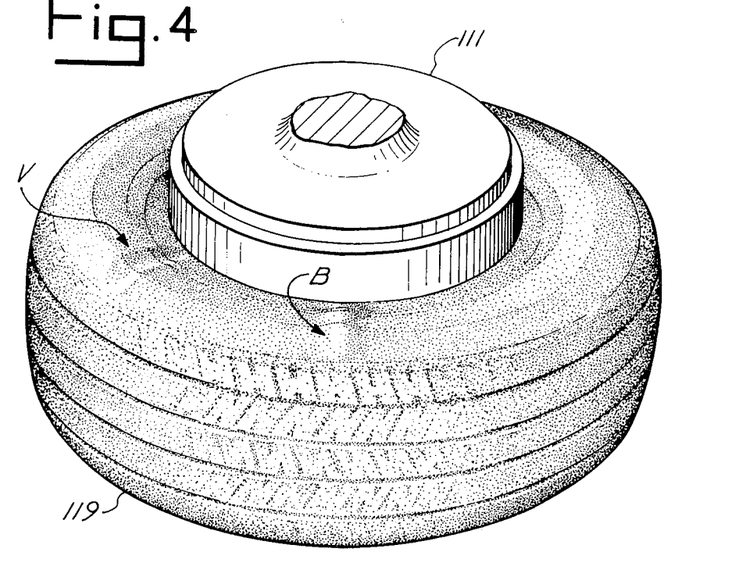
FIG. 4 is an enlarged perspective view of the tire mounted and inflated.

Tire 119 is typically carried to machine 110 by an automated conveyor and is automatically positioned upon lower chuck 116, inflated, and caused to rotate by contact with rotating roller 123. A pulse generator 125 (FIG. 6) attached to spindle 114 generates an electrical pulse each time the tire rotates through one degree of arc (360 pulse per revolution) and transmits the pulse over a conductor 127. Probes 118a and 118b are then brought into contacting engagement with opposite sidewalls W1 and W2 of the tire. As shown in FIG. 5, the probes track a relatively thin section of the sidewalls about a circumference which is unobstructed by lettering or other molded depressions or protusions such that the movement of the probes are characteristic of deflections of the sidewalls themselves. As tire 119 is rotated, probes 118a and 118b ride on the sidewalls of the tire, and the transducers associated with the probes produce analog signals having values proportional to the lateral runout of the sidewalls. Thus, the probes are able to detect a bulge B or a valley V (FIG. 4).

In the event there are undesired deformations in sidewall W1, dimension LR1 extending from plane P to the outside of the sidewall will experience fluctuations (FIG. 3). Likewise, if there are undesired deformations in sidewall W2, the lateral runout dimension LR2 between plane P and the outside of sidewall W2 will fluctuate. As shown in FIG. 3, plane P is perpendicular to the axis of rotation of the tire and passes through the center of the tire thereby dividing the tire into two equal sections with bilateral symmetry.

Referring to FIG. 6, tracking probes 118a and 118b are connected to a computer or processing device 140. Preferably the computer comprises a model HP 1,000 L-series manufactured by Hewlett-Packard Corporation. This computer has a random access memory 142, an analog input card 144 which contains an analog-to-digital converter, and a digital output card 145 which provides signals to gating and marking devices shown in FIG. 9. As shown in FIG. 6, the tracking probes are connected through conductors 134 and 136 to the analog input card of the computer. The computer also contains a terminal 150 which is preferably a model HP 2645a also manufactured by Hewlett-Packard Corporation. The terminal contains a CRT display 152 and a keyboard 154. The terminal is connected to computer 140 through a conventional buss 156 supplied by Hewlett-Packard.

Figure 9:
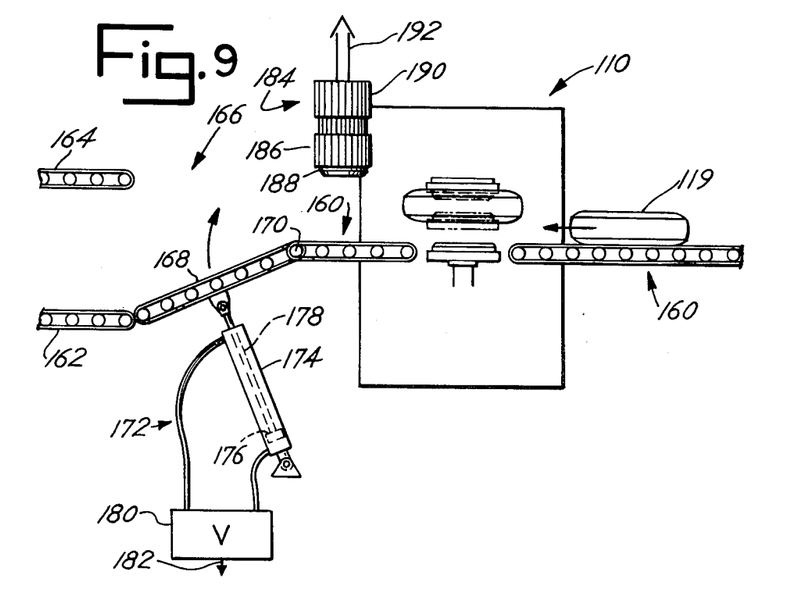
FIG. 9 is a schematic side elevation of a preferred form of tire marking and gating apparatus for use in connection with the preferred embodiment.

Referring to FIG. 9, tire 119 is carried to testing machine 110 by a conventional conveyor 160. If the tire is defective, it is conveyed to a conveyor 162; if the tire is acceptable, it is conveyed to a conveyer 164. Proper conveying of the tire is achieved through a gating mechanism 166 comprising a conveyor 168 which is rotated around an axis 170 by a pneumatic controller 172. Controller 172 includes a cylinder 174 fitted with a piston 176 which raises or lowers a connecting rod 178. Compressed air is admitted to the upper or lower sides of the piston by a valve 180 controlled by a logical gating signal transmitted over a conductor 182.

The tire can be marked with ink by means of a marking mechanism 184 comprising 8 stamped plates 186 which are primed by an ink supply 188. Eight solenoids 190 (one for each plate) are capable of depressing individual plates into contact with the tire. By energizing combinations of solenoids, $2^8$ different patterns of marks can be placed on the tire. The solenoids are controlled by an 8-bit buss 192 connected to computer 140 (FIG. 6).

Figure 7A:
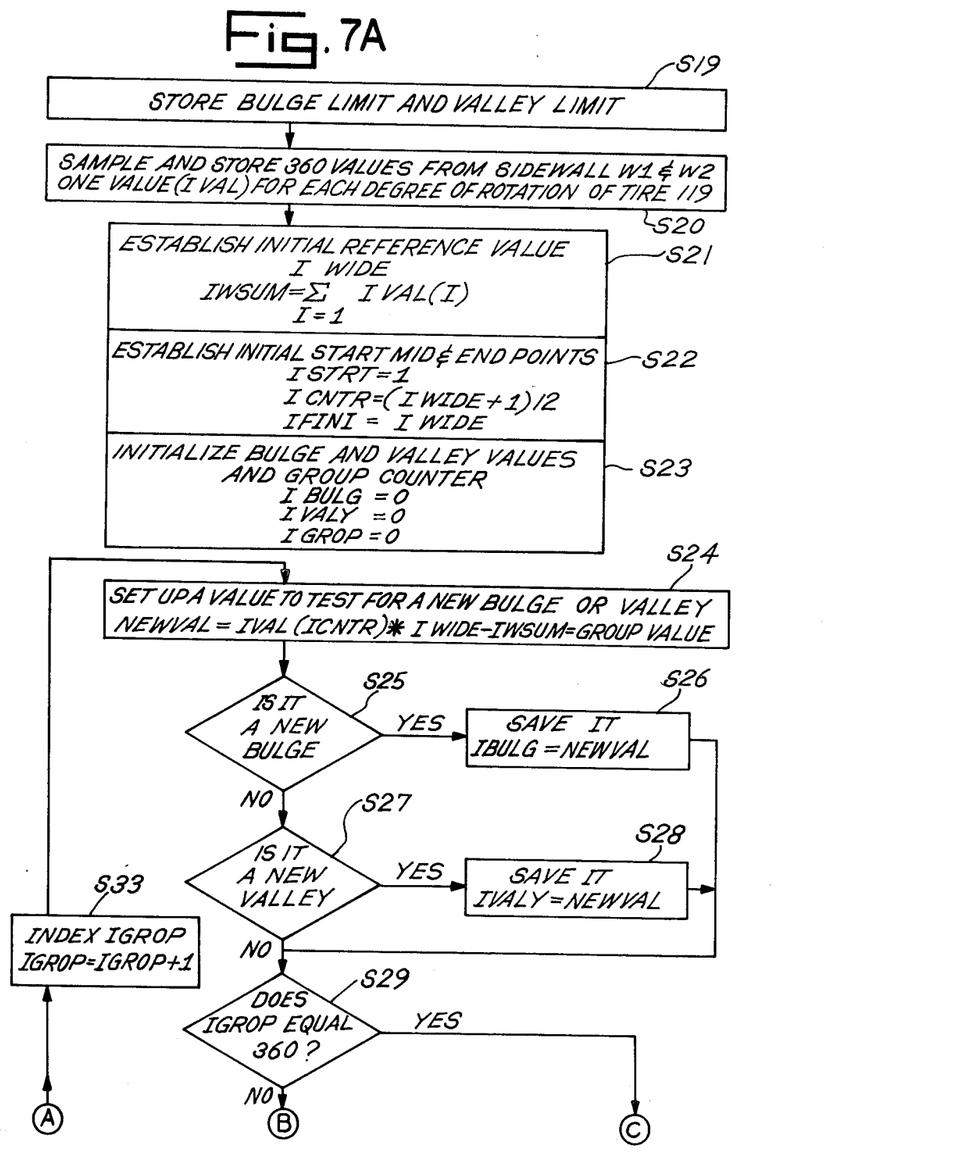
FIGS. 7A and 7B are flow diagrams illustrating one preferred form of program for the processing apparatus shown in FIG. 6.

Referring to FIG. 7A, the computer is programmed to convert the analog signals received on conductors 134 and 136 into digital form, to store those signals in a random access memory 142, to process the signals in a unique manner, and to indicate whether the deformations of either sidewall W1 or sidewall W2 exceed limits which can be inserted into the program by the operator.

As shown in step S19, the operator stores the maximum allowable bulge limit and the minimum allowable valley limit through operation of keyboard 154 and display 152. Preferably, the bulge limit is 20 and the valley limit is 25 although other limits can be inserted depending on the desired tire specifications. These limits need to be reset only once for each different batch of tires, and then only if the tire specifications require different limits.

Figure 8:
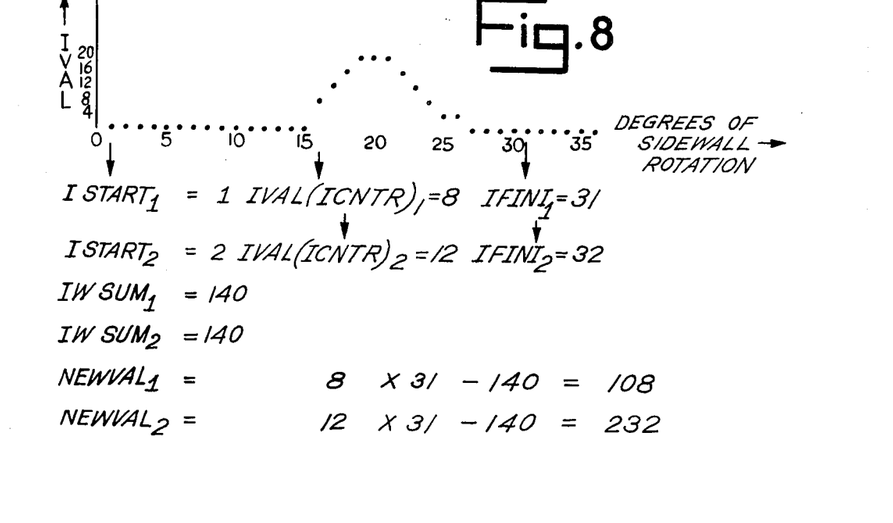
FIG. 8 is a timing diagram illustrating how some of the steps in the flow diagrams of FIGS. 7A and 7B operate on exemplary groups of input data.

In step S20, the computer samples and stores in digital form 360 values from sidewall W1 and 360 values from sidewall W2 (FIG. 3). One value for each of sidewalls W1 and W2 designated "IVAL", is stored for each degree of rotation of tire 119. Thus 360 values correspond to the entire 360 degree arc of sidewall W1, and a like number of values correspond to the entire 360 degree arc of sidewall W2. The first 36 of these values of sidewall W1 are represented in FIG. 8. Each of the values can be designated by a variable IVAL which is established by the computer program.

In Step S21, the program establishes an initial reference base by summing values of IVAL stored in memory for sidewall W1 from the value 1 through the value of a variable IWIDE. IWIDE preferably equals 31, but useful results can be obtained by IWIDE values between 10 and 100 (corresponding to sidewall arcs between 10 degrees and 100 degrees), depending on the type of tire defect being detected. Assuming IWIDE equals 31, the first 31 lateral runout values (IVAL) are summed by the computer and stored as variable IWSUM. As shown in FIG. 8, IWSUM for the first 31 degrees of rotation equals 140.

In step S22, other initial values used in connection with the first group of lateral runout values are established. That is, computer variables ISTRT, ICENTR and IFINI are established. As shown in FIG. 8, these values for the first group of 31 lateral runout values equal 1, 16 and 31, respectively.

In step S23, a program variable IBULG, corresponding to the initial sidewall bulge deformation, is set equal to 0, and the program variable IVALY, corresponding to the initial sidewall valley deformation, is set equal 0. Reference values for 360 different groups of lateral runout values are ultimately calculated, and a variable IGROP is established as a software counter to keep track of how many groups have been calculated. The counter is initially set equal to 0.

In step S24, the reference value IWSUM is compared to the lateral runout value at degree 16 (i.e., value ICNTR) multiplied times IWIDE. The difference is a group deformation value (NEWVAL) indicative of the degree of deformation corresponding to the lateral runout values represented by the first 31 degrees of rotation. As shown in FIG. 8, the first NEWVAL value (NEWVAL$_1$) is 108.

NEWVAL is then compared with the current value of IBULG in order to determine whether a new bulge value should be stored. According to step S25, a new bulge value is indicated if the current value of NEWVAL exceeds the current value of IBULG. If so, the new value is stored as a new IBULG value in step S26. Since 108 (NEWVAL$_1$) is greater than 0 (IBULG), the value IBULG is changed to 108.

If a new bulge value does not result from step S25, the current value of NEWVAL is compared with the current value of IVALY in step S27. If IVALY exceeds NEWVAL, a new valley value is stored in step S28. In the initial step described so far, if NEWVAL is a positive number, it indicates a new bulge value; if it is a negative number, it indicates a new valley value.

In step S29, the program determines whether the variable IGROP equals 360. Since only one group of lateral runout values has been considered at this point in time, the answer is no, and the program moves on to step S30.

Figure 7B:
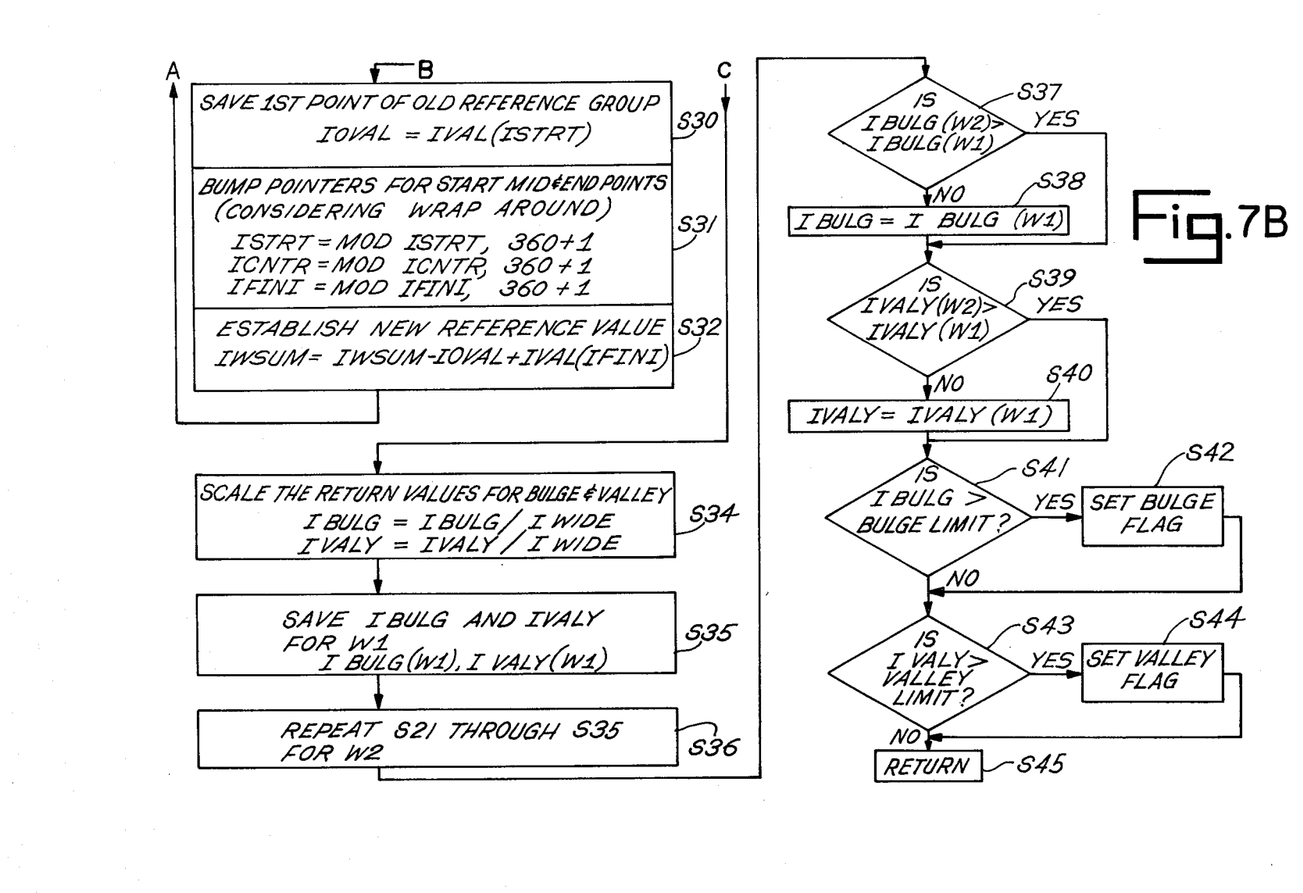

Referring to FIG. 7B, steps S30–32 are used to calculate a new group value corresponding to the lateral runout values representing degrees 2–32 of sidewall rotation. In other words, while the initial group corresponded to degrees 1–31 of rotation, the next group under consideration corresponds to degrees 2–32. This portion of the program can be analogized to a 31 degree-wide window which is placed over the tire in order to analyze lateral runout values which show through the window. The window is then rotated 1 degree so that one of the former values is covered up and a new value is exposed. By subtracting the covered up value and adding the newly exposed value, the sum of the values for the new group can be quickly determined without performing the complete summation required in step S21. In accordance with this approach, in step S30, the first point of the old reference group (i.e., IVAL corresponding to rotation degree 1) is stored so that it can be later subtracted from the total group value.

In step S31, pointers for the same values calculated in step S22 are indexed by 1 by means of a modulus operator MOD. This is a standard FORTRAN function which subtracts 360 before indexing in the event the variable exceeds 360. This is needed so that the proper values will be calculated with the window wraps around the entire circumference of the tire and uses some of the initial starting values in the group corresponding to degrees 1–31.

In step S32, a new reference value is calculated by subtracting the old "covered up" value (IOVAL) and adding the "newly exposed" value (i.e., IVAL at degree 32) and storing the resulting value as variable IWSUM. As shown in FIG. 8, IWSUM$_2$ for the second group (degrees 2–32) is still 140. After the new reference value for the new group of lateral runout values has been calculated in step S32, the program indexes variable IGROP in step S33 (FIG. 7A). The program then returns to step S24 in order to calculate a new group value (NEWVAL) for the second group. NEWVAL for the second group (NEWVAL$_2$) is calculated to be 232 (see FIG. 8). Since NEWVAL$_2$ is greater than the previous value for IBULG (i.e., 108), 232 is stored as the new value for IBULG in step S26. The program then proceeds through steps S27–S33 as previously described.

After 360 groups of values have been considered, the variable IGROP equals 360, and the program branches to step S34 (FIG. 7B). In step S34, the IBULG and IVALY variables are scaled by dividing by 31 (the value of IWIDE) in order to prepare these values for proper comparison with the bulge and valley limits established in step S19.

In step S35, the scaled IBULG and IVALY values are stored for later comparison to limits.

In step S36, steps S21–S35 are repeated for lateral runout values of sidewall W2, and the values scaled in step S35 are stored as values IBULG (W2) and IVALY (W2).

If IBULG (W2) is not greater then IBULG (W1), the variable IBULG is set equal to the scaled IBULG value for the sidewall W1 in steps S37 and S38. The operation is performed on the scaled IVALY values for sidewalls W1 and W2 in steps S39 and S40.

According to step S41, if the value of IBULG is greater than the bulge limit established in step S19, a BULGE flag is set in step S42. If the value of IVALY is greater than the valley limit established in step S19 (step S43), a VALLEY flag is set in step S44. The IBULG and IVALY values used in steps S41 and S43 are indicative of the degree of deformation in sidewalls W1 and W2 as a whole, and can be used as an accurate measure of the condition of the tire resulting from the component preparation, assembly, and curing steps of the manufacturing process (FIG. 1).

In step S45, the program returns to step S20 to repeat the sequence described above in connection with the next tire.

In response to the setting of the BULGE flag in step S42, the marking apparatus shown in FIG. 9 can be initiated through buss 192 in order to mark the tire with indicia indicating the presence of an unacceptable bulge. Likewise, in response to the setting of the VALLEY flag in step S44, the same apparatus can be set through buss 192 to mark the tire with indicia indicating the presence of an unacceptable valley in the sidewall. Similarly, a logical one signal can be transmitted over conductor 182 in order to raise conveyor gate 168 to a position adjacent conveyor 164 in order to segregate a tire having an unacceptable bulge or valley from the tires which are acceptable.

Figure 10A:
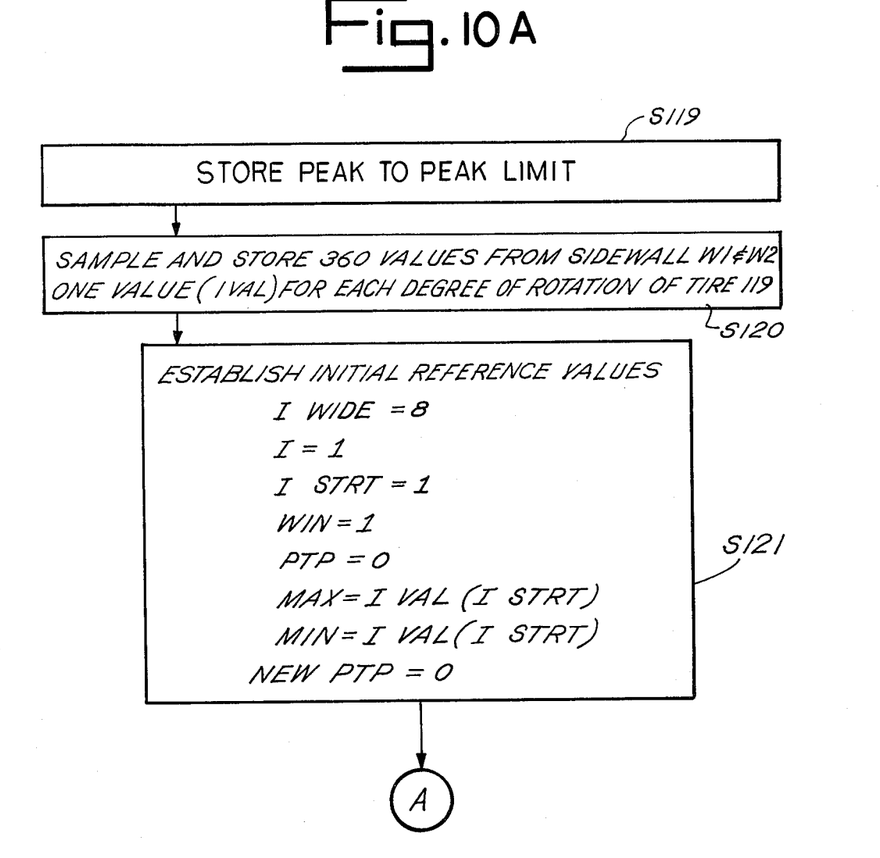
FIGS. 10A, 10B and 10C are flow diagrams illustrating another preferred form of program for the processing apparatus shown in FIG. 6.

Referring to FIG. 10A, according to another embodiment of the invention, the computer is programmed to convert the analog signals received on conductors 134 and 136 into digital form, to store those signals in a random access memory 142, to process the signals in a unique manner, and to indicate whether the deformation of either sidewall W1 or sidewall W2 exceed a limit which can be inserted into the program by the operator.

As shown in step S119, the operator stores the maximum allowable peak-to-peak limit through operation of keyboard 154 and display 152. Preferably, the limit is approximately 40, corresponding to 0.040 inch, although other limits can be inserted depending on the desired tire specifications. This limit needs to be reset only once for each different batch of tires, and then only if the tire specifications require a different limit.

Figure 11:
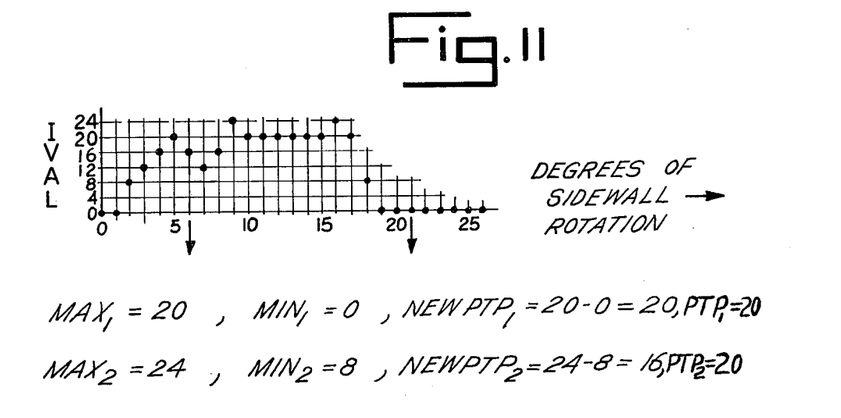
FIG. 11 is a timing diagram illustrating how some of the steps in the flow diagrams of FIGS. 10A-10C operate on exemplary groups of input data.

In step S120, the computer samples and stores in digital form 360 values from sidewall W1 and 360 values from sidewall W2 (FIG. 3). One value for each of sidewall W1 and W2 designated "IVAL", is stored for each degree of rotation of tire 119. Thus 360 values correspond to the entire 360 degree arc of sidewall W1, and a like number of values correspond to the entire 360 degree arc of sidewall W2. The first 26 of these values for sidewall W1 are represented in FIG. 11. Each of the values can be designated by a variable IVAL which is established by the computer program. In step S121, the program establishes initial reference values of the indicated variables. IWIDE preferably equals 8, but useful results can be obtained by IWIDE values between about 4 and about 30 (corresponding to sidewall arcs between 4 degrees and 30 degrees), depending on the type of tire defect being detected. The other variables are set at the values shown in step S121 (FIG. 10A).

Figure 10B:
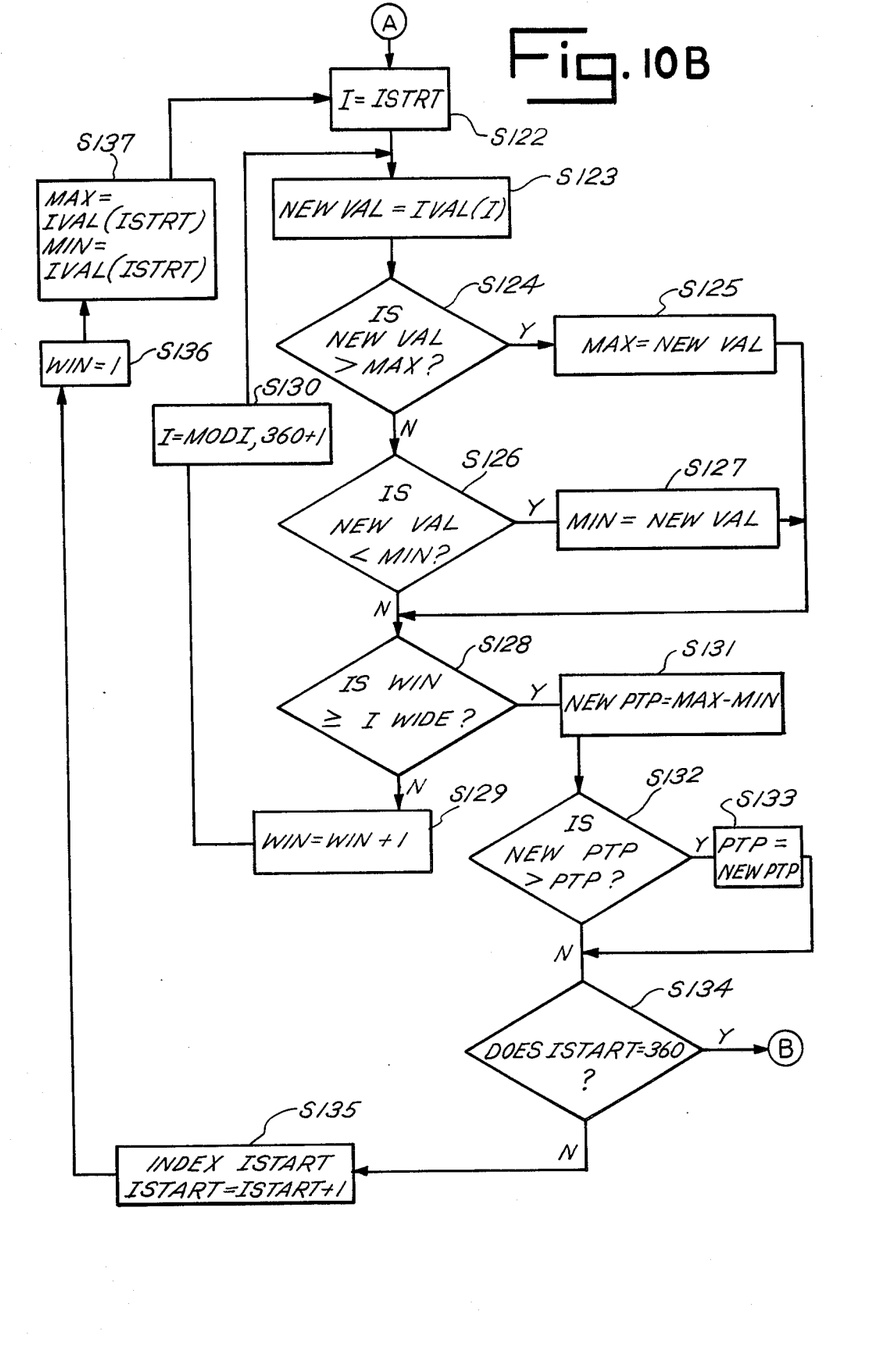

Referring to FIG. 10B, in step S122, variable I is set equal to the value of the variable ISTRT. In step S123, the value of variable NEW VAL is set equal to the value of variable IVAL at value I. In this case, since I equals 1, the value of IVAL is zero as is shown in FIG. 11. In step S124, the value of NEW VAL is compared to the value of MAX. If NEW VAL is greater than MAX, the value of MAX is replaced with the value of NEW VAL in step S125. In the present example, since both NEW VAL and MAX have a value of zero, the program advances to step S126 where NEW VAL is compared with the value of MIN. If NEW VAL is less than MIN, the value of MIN is set equal to the value of NEW VAL in step S127. In this case, since both NEW VAL and MIN have values of zero, the program advances to step S128 in which variable WIN is compared with variable IWIDE. Since, in this example, IWIDE is 8, whereas WIN is 1, the program advances to step S129 in which the value of WIN is indexed by one. In step S130, the value of I is also indexed by one. As shown in FIG. 10B, in step S130, the value of I is indexed by means of a modulus operator MOD. This is a standard FORTRAN function which subtracts 360 before indexing in the event a variable exceeds 360. This is needed so that the proper values will be calculated when the 8 degree window set by the value of IWIDE wraps around the entire circumference of the tire and uses some of the initial starting values in this group corresponding to degrees 1-15.

The program then proceeds again through the loop formed by steps S123-130 with respect to the value of IVAL at I equals 2. Since IVAL at I equals 2 has the value 8, a new value for MAX will be stored in step S125. The program proceeds through the loop until the value of WIN equals 8 (the value of IWIDE) at which time MAX equals 20 and MIN equals zero (see FIG. 11). The program then branches to step S131 which stores a first deformation value as variable NEW PTP. As shown in FIG. 11, the first value of NEW PTP is 20. In step S132, since NEW PTP is greater than the initial value of PTP, the value of PTP is set equal to 20 in step S133. In step S134, since the value of ISTRT is less than 360, ISTRT is incremented in step S135 and the value of WIN is set equal to 1 in step S136. The values of MAX and MIN are reset in step S137 and the value of I is set equal to the new value of ISTRT (i.e., 2) in step S122. The program then processes the loop including steps S123-S130 with respect to IVAL values 2-9 (FIG. 11). As shown in FIG. 11, the minimum is at IVAL (2) and the maximum is at IVAL (9). At the end of the loop, the second value of NEW PTP is 24 minus 8 equals 16. Since this value is less than the current value of PTP (i.e., 20), the value of PTP is not changed in steps S132 and S133, and the program advances to step S134.

Figure 10C:
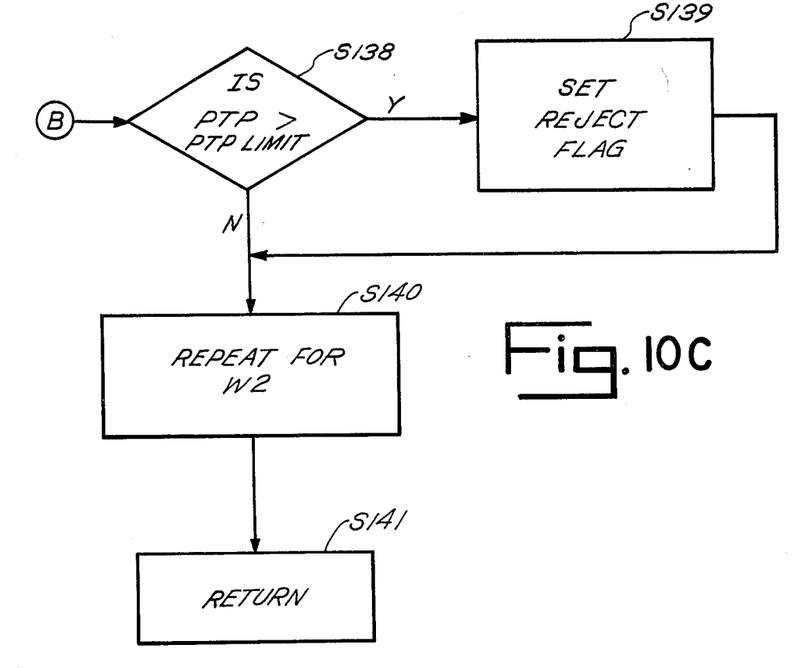

The data continues to be processed in the foregoing manner for each group of 8 IVAL values around the entire circumference of the tire. Each NEW PTP value is a group deformation value indicating the degree of deformation in the portion of the sidewall represented by the group of IVAL values used to determine the new NEW PTP value. When all 360 groups of 8 values have been processed, the program branches to step S138 (FIG. 10C) to determine whether the then existing PTP value is greater than the PTP limit set by the operator. If it is, a reject deformation flag is set in step S139; if not, the same process is repeated for side W2 of the tire in step S140. After both sides W1 and W2 of the tire have been processed, the program returns through step S141 (FIG. 10C). If the reject deformation flag is set in step S139, the tire is segregated from the acceptable tires in the manner described previously in connection with FIG. 9.

Although the best modes of the invention known to the applicant have been described herein, those skilled in the art will recognize that the best modes may be altered and modified without departing from the true spirit and scope of the invention as defined in the accompanying claims.

What is claimed is:

1. In a tire manufacturing system including means for assembling and curing components of the tire and for testing the cured tire by detecting lateral runout values for at least one sidewall of the tire, improved apparatus for determining the degree of sidewall deformation resulting from the assembling and curing, said apparatus comprising:

storage means for storing a plurality of the lateral runout values;

processing means for segregating the lateral runout values into a plurality of groups, for generating with respect to each of the plurality of groups a group deformation value indicating the degree of deformation in the portion of the sidewall represented by one of the groups, and for generating a deformation flag signal if any of the group deformation values generated for the plurality of groups has a predetermined relationship with respect to a predetermined limit; and means for indicating the condition of the tire in response to the deformation flag signal.

2. In tire testing apparatus capable of generating an analog signal corresponding to the lateral runout values for at least one sidewall of a tire, improved means for determining the degree of deformation present in the sidewall of the tire comprising:

means for converting the analog signal to digital signals representing a plurality of the lateral runout values;

storage means for storing a plurality of the digital signals corresponding to digital lateral runout values;

processing means for segregating the lateral runout values into a plurality of groups, for generating with respect to each of the pluality of groups a group deformation value indicating the degree of deformation in the portion of the sidewall represented by one of the groups, and for generating a deformation flag signal if any of the group deformation values generated for the plurality of groups has a predetermined relationship with respect to a predetermined limit; and means for indicating the condition of the tire in response to the deformation flag signal.

3. Apparatus as claimed in claims 1 or 2, wherein the processing means comprises means for generating the group deformation value for each group by calculating the difference between the maximum runout value and minimum runout value within the group.

4. Apparatus, as claimed in claim 3, wherein the processing means comprises means for defining each of said groups to represent 4 to 30 degrees of sidewall arc.

5. Apparatus, as claimed in claim 3, wherein the processing means comprises means for defining each of said groups to represent substantially 8 degrees of sidewall arc.

6. Apparatus, as claimed in claim 3, wherein the processing means comprises means for defining the groups to represent overlapping portions of the sidewall.

7. Apparatus, as claimed in claim 3, wherein the processing means comprises means for adjusting the predetermined limit.

8. Apparatus, as claimed in claim 3, wherein the means for indicating comprises means for marking the tire.

9. Apparatus, as claimed in claim 3, wherein the means for indicating comprises means for gating the tire.

10. Apparatus, as claimed in claim 1, wherein the lateral runout values are detected by generating an analog signal and wherein the apparatus further comprises means for converting the analog signal to digital signals representing a plurality of the lateral runout values.

11. Apparatus, as claimed in claim 10, wherein the storage means comprises a digital memory.

12. Apparatus, as claimed in claims 1 or 2, wherein the processing means comprises means for generating a group deformation value of a first polarity indicative of a sidewall bulge and for generating a group deformation value of a second polarity opposite the first polarity indicative of a sidewall valley.

13. Apparatus, as claimed in claim 12, wherein the processing means comprises means for comparing the group deformation values in order to generate a first resultant deformation value indicative of the maximum bulge for the sidewall as a whole, for generating a second resultant deformation value indicative of the minimum valley for the sidewall as a whole, for comparing the first resultant deformation value to a first predetermined limit and for comparing the second resultant deformation value to a second predetermined limit, and wherein the means for indicating comprises means for indicating the condition of the tire based on the comparison of the first resultant deformation value to the first predetermined limit and the comparison of the second resultant deformation value to the second predetermined limit.

14. Apparatus, as claimed in claim 13, wherein the processing means comprises means for adjusting the first and second predetermined limits.

15. Apparatus, as claimed in claims 1 or 2, wherein the means for indicating comprises means for marking the tire.

16. Apparatus, as claimed in claims 1 or 2, wherein the means for indicating comprises means for gating the tire.

17. Apparatus, as claimed in claims 1 or 2, wherein the processing means comprises means for defining each of said groups to represent 10 to 100 degrees of sidewall arc.

18. Apparatus, as claimed in claim 17, wherein the processing means comprises means for defining each of said groups to represent substantially 31 degrees of sidewall arc.

19. Apparatus, as claimed in claims 1 or 2, wherein the processing means comprises means for defining the groups to represent overlapping portions of the sidewall.

20. Apparatus, as claimed in claims 1 or 2, wherein the processing means comprises means for adjusting the predetermined limit.

21. In a tire manufacturing method including assembling and curing the tire and testing the cured tire by detecting lateral runout values for at least one sidewall of the tire, an improved process for determining the degree of sidewall deformation resulting from the assembling the curing comprising the steps of:
storing a plurality of the lateral runout values;
segregating the lateral runout values into a plurality of groups;
gnerating with respect to each of the plurality of groups a group deformation value indicative of the degree of deformation in the portion of the sidewall represented by one of the groups;
generating a deformation flag signal if any of the group deformation values generated for the plurality of groups has a predetermined relationship with respect to a predetermined limit; and
indicating the condition of the tire in response to the deformation flag signal.

22. In a tire testing method capable of generating an analog signal corresponding to the lateral runout values for at least one sidewall of a tire, an improved process for determining the degree of deformation present in the sidewall of the tire comprising the steps of:
converting the analog signal to digital signals representing a plurality of the lateral runout values;
segregating the lateral runout values into a plurality of groups;
generating with respect to each of the plurality of groups a group deformation value indicative of the degree of deformation in the portion of the sidewall represented by one of the groups;
generating a deformation flag signal if any of the group deformation values generated for the plurality of groups has a predetermined relationship with respect to a predetermined limit; and
indicating the condition of the tire in response to the deformation flag signal.

23. A method, as claimed in claims 21 or 22, wherein the step of generating the group deformation value comprises the step of calculating the difference between the maximum runout value and minimum runout value within the group.

24. A process, as claimed in claim 23, and further comprising the step of defining each of said groups to represent 4 to 30 degrees of sidewall arc.

25. A process, as claimed in claim 24, wherein the step of defining comprises the step of defining each of said groups to represent substantially 8 degrees of sidewall arc.

26. A process, as claimed in claim 23, and further comprising the step of defining the groups to represent overlapping portions of the sidewall.

27. A process, as claimed in claim 23, and further comprising the step of adjusting the predetermined limit.

28. A process, as claimed in claim 23, wherein the step of indicating comprises marking the tire.

29. A process, as claimed in claim 23, wherein the step of indicating comprises gating the tire.

30. A process, as claimed in claim 21, wherein the lateral runout values are detected by generating an analog signal and wherein the process further comprises the step of converting the analog signal to digital signals representing a plurality of the lateral runout values.

31. A process, as claimed in claim 30, wherein the step of storing comprises the step of storing digital values.

32. A process, as claimed in claims 21 or 22, wherein generation of the group deformation value comprises the steps of:
generating a group deformation value of a first polarity indicative of a sidewall bulge; and
generating a group deformation value of a second polarity opposite the first polarity indicative of a sidewall valley.

33. A process, as claimed in claim 32, and further comprising the steps of:
comparing the group deformation values in order to generate a first resultant deformation value indicative of the maximum bulge for the sidewall as a whole;
generating a second resultant deformation value indicative of the minimum valley for the sidewall as a whole;
comparing the first resultant deformation value to a first predetermined limit;

comparing the second resultant deformation value to a second predetermined limit; and indicating the condition of the tire based on the comparison of the first resultant deformation value to the first predetermined limit and the comparison of the second resultant deformation value to the second predetermined limit.

34. A process, as claimed in claim 32, and further comprising the step of adjusting the first and second predetermined limits.

35. A process, as claimed in claims 23 or 24, and further comprising the step of defining each of said groups to represent 10 to 100 degrees of sidewall arc.

36. A process, as claimed in claim 31, and further comprising the step of defining each of said groups to represent substantially 31 degrees of sidewall arc.

37. A process, as claimed in claims 21 or 22, and further comprising the step of defining the groups to represent overlapping portions of the sidewall.

38. A process, as claimed in claims 21 or 22, and further comprising the step of adjusting the predetermined limit.

39. A process, as claimed in claims 21 or 22, wherein the step of indicating comprises marking the tire.

40. A process, as claimed in claims 21 or 22, wherein the step of indicating comprises gating the tire.

* * * * *